United States Patent
Lee et al.

(10) Patent No.: US 8,532,409 B2
(45) Date of Patent: Sep. 10, 2013

(54) ADAPTIVE MOTION SEARCH RANGE DETERMINING APPARATUS AND METHOD

(75) Inventors: Suk Ho Lee, Daejeon (KR); Seong Mo Park, Daejeon (KR); Nak Woong Eum, Daejeon (KR); Hee-Bum Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 10 days.

(21) Appl. No.: 13/301,093

(22) Filed: Nov. 21, 2011

(65) Prior Publication Data

US 2012/0128261 A1 May 24, 2012

(30) Foreign Application Priority Data

Nov. 22, 2010 (KR) .................. 10-2010-0116462

(51) Int. Cl.
*H04N 7/50* (2006.01)

(52) U.S. Cl.
USPC ............ 382/236; 382/232; 382/239; 382/107

(58) Field of Classification Search
USPC ............... 382/232, 236, 239, 107; 341/50, 341/51; 348/208.99; 375/240.16, 240.024; 435/7.21, 40.5; 514/21.9; 530/329, 330
See application file for complete search history.

(56) References Cited

U.S. PATENT DOCUMENTS

| 5,745,504 A | * | 4/1998 | Bång .......................... 714/752 |
| 8,107,748 B2 | * | 1/2012 | Miao et al. .................. 382/236 |
| 2010/0111184 A1 | | 5/2010 | Shimizu et al. |

FOREIGN PATENT DOCUMENTS

| KR | 1995-0009699 | 8/1995 |
| KR | 20040089163 A | 10/2004 |

OTHER PUBLICATIONS

Sukho Lee et al., "270 MHz Full HD H.264/AVC High Profile Encoder with Shared Multibank Memory-Based Fast Motion Estimation", ETRI Journal, vol. 31, No. 6, Dec. 2009, pp. 784-794.

* cited by examiner

*Primary Examiner* — Anh Do
(74) *Attorney, Agent, or Firm* — Rabin & Berdo, P.C.

(57) ABSTRACT

Provided is an adaptive motion search range determining apparatus and method for encoding UHD-class high-resolution images. The adaptive motion search range determining apparatus includes an MVD average/standard deviation calculation unit calculating an value average and a standard deviation of MVDs of neighboring macroblocks of a current macroblock, and a motion search range determination unit determining a motion search range of the current macroblock using the value average and the standard deviation. According to the adaptive motion search range determining apparatus, it is possible to enable each macroblock to have an adaptive search range by variably adjusting a motion vector search range of a current macroblock with reference to motion vectors of neighboring macroblocks of the current macroblock.

10 Claims, 3 Drawing Sheets

REFER TO CURRENT MACROBLOCK POSITION IN PREVIOUS FRAME

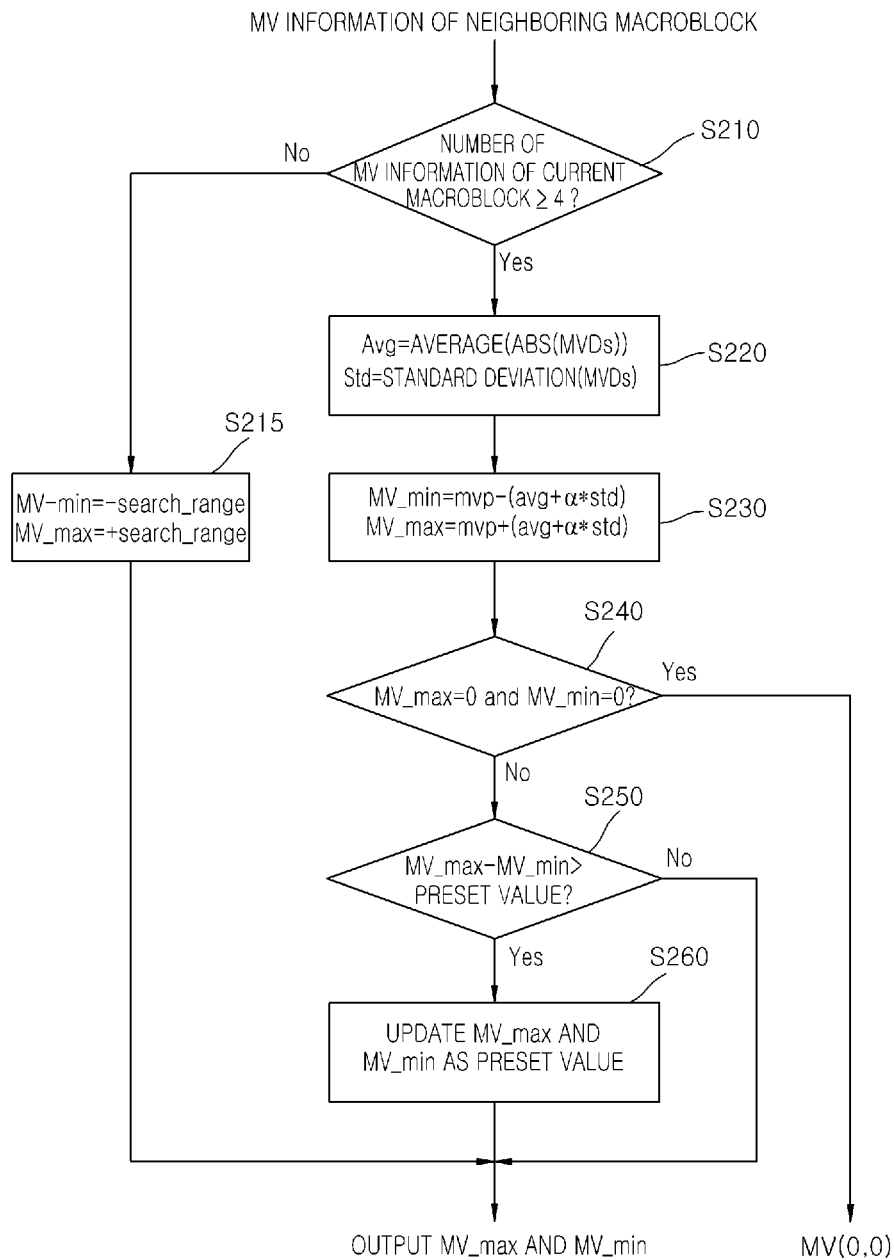

ADAPTIVE MOTION SEARCH RANGE DETERMINING APPARATUS AND METHOD

CROSS-REFERENCE TO RELATED APPLICATIONS

The present application claims priority to Korean patent application number 10-2010-0116462, filed on Nov. 22, 2010, which is incorporated by reference in its entirety.

BACKGROUND OF THE INVENTION

The present invention relates to an adaptive motion search range determining apparatus and method, and more particularly, to an adaptive motion search range determining apparatus and method for encoding an image with high-resolution of Ultra High Definition (UHD) class, which enable each macroblock to have an adaptive search range by variably adjusting a motion vector search range of a current macroblock with reference to motion vectors of neighboring macroblocks of the current macroblock.

High-speed of motion modules requiring a lot of computation quantities and hardware is especially essential to encode high-definition images in real-time. In the case of low-resolution images, enough efficiency could be obtained even though search ranges are narrow. In the case of high-resolution images such as UHD images, however, the size of a search range should increase in proportion to the increase in the size of an image. However, since the complexity of an image encoder also increases as the size of search range increases, an excessive large search range acts on the image encoder as a burden.

Therefore, in order to reduce the burden of image encodes, even though images have high-resolution, it is important to properly determine the size of a search range.

The above-described technology means the background in the art to which the present invention pertains, but does not mean the prior art.

When encoding images after properly determining the size of a search range as above, motion search has been typically performed according to a search range which is fixed in size, or arbitrarily adjusted in size according to image resolution.

However, when images have not a lot of motions, there is a limitation in that the aforesaid method increases computation quantity because motion search is still performed in an unnecessary search range, thus making it difficult to realize real-time encoding.

SUMMARY OF THE INVENTION

Embodiments of the present invention are directed to an adaptive motion search range determining apparatus and method, which enable each macroblock to have an adaptive search range by variably adjusting a search range of a motion vector with reference to neighboring motion vectors using the fact that a motion vector of a current macroblock is similar to motion vectors of neighboring macroblocks at the nearest positions.

Embodiments of the present invention are also directed to an adaptive motion search range determining apparatus and method, which are capable of minimizing image degradation during the motion searches of high-resolution images by variably adjusting search ranges for motion vectors, and are also capable of encoding high-resolution images such as UHD images by limiting motion searches in unnecessary areas and thus minimizing the computation quantities required for prediction of motion vectors.

In an embodiment, an adaptive motion search range determining apparatus, includes: an MVD (Motion Vector Difference) average/standard deviation calculation unit configured to calculate a value average and a standard deviation of MVDs of neighboring macroblocks of a current macroblock, wherein the MVDs are difference values between motion vectors of the neighboring macroblocks and a Motion Vector Predictor (MVP) and are stored sequentially in a frame memory, the Motion Vector Predictor (MVP) being a median of the motion vectors of the neighboring macroblocks; and a motion search range determination unit configured to determine a motion search range of the current macroblock using the value average and the standard deviation, wherein the neighboring macroblocks comprise a left macroblock, an upper middle macroblock, an upper left macroblock, and an upper right macroblock of a current image frame to which the current macroblock belongs, and a macroblock located at the same position as a position of the current macroblock in a previous image frame.

In the present invention, the motion search range determination unit may determine the motion search range of the current macroblock as an initially determined search range when the number of motion vector information of the neighboring macroblocks is smaller than 4.

In the present invention, the motion search range determination unit may update the motion search range of the current macroblock as the initially determined search range when the motion search range is greater or smaller than the initially determined search range.

The present invention may further include a motion vector early determination unit configured to early determine at least one of X and Y components of a motion vector of the current macroblock as 0 (zero) when at least one of the X and Y components of the motion search range is 0 (zero).

In the present invention, the motion search range determination unit may determine the motion search range according to Equations below:

$$MVPx - (avgx + \alpha^* stdx) \leq MVx \leq MVPx + (avgx + \alpha^* stdx)$$

$$MVPy - (avgy + \alpha^* stdy) \leq MVy \leq MVPy + (avgy + \alpha^* stdy)$$

where, MVPx and MVPy denote X component and Y component of the Motion Vector Predictor (MVP), MVx and MVy represent X component and Y component of a motion vector of the current macroblock, avgx denotes an average of X component values of the MVDs of the neighboring macroblocks, stdx represents a standard deviation of the X component values of the MVDs of the neighboring macroblocks, avgy represents an average of Y component values of the MVDs of the neighboring macroblocks, stdy denotes a standard deviation of the Y component values of the MVDs of the neighboring macroblocks, and α represents a constant for adjusting the motion search range.

In another embodiment, an adaptive motion search range determining method includes: calculating a value average and a standard deviation of MVDs of neighboring macroblocks of a current macroblock which are read from a frame memory, wherein the MVDs are difference values between motion vectors of the neighboring macroblocks and a Motion Vector Predictor (MVP), and the Motion Vector Predictor (MVP) is a median of the motion vectors of the neighboring macroblocks; and determining a motion search range of the current macroblock using the value average and the standard deviation, wherein the neighboring macroblocks comprise a left macroblock, an upper middle macroblock, an upper left macroblock, and an upper right macroblock of a current image frame to which the current macroblock belongs, and a macroblock located at the same position as a position of the current macroblock in a previous image frame.

In the present invention, the calculating of the value average and standard deviation and the determining of the motion search range are performed when the number of motion vector information for the neighboring macroblocks of the current macroblock is 4 or more in a current image frame stored in the frame memory, and the motion search range of the current macroblock is precedently determined as an initially determined search range when the number of motion vector information of the neighboring macroblocks is smaller than 4.

In the present invention, the determining of the motion search range may include updating the motion search range of the current macroblock as the initially determined search range when the motion search range is greater or smaller than the initially determined search range.

The present invention may further include determining early at least one of X and Y components of a motion vector of the current macroblock as 0 (zero) when at least one of X and Y components of the motion search range is 0 (zero).

In the present invention, the determining may include determining the motion search range according to Equations below:

$$MVPx-(avgx+\alpha*stdx) \leq MVx \leq MVPx+(avgx+\alpha*stdx)$$

$$MVPy-(avgy+\alpha*stdy) \leq MVy \leq MVPy+(avgy+\alpha*stdy)$$

where, MVPx and MVPy denote X component and Y component of the Motion Vector Predictor (MVP), MVx and MVy represent X component and Y component of a motion vector of the current macroblock, avgx denotes an average of X component values of the MVDs of the neighboring macroblocks, stdx represents a standard deviation of the X component values of the MVDs of the neighboring macroblocks, avgy represents an average of Y component values of the MVDs of the neighboring macroblocks, stdy denotes a standard deviation of the Y component values of the MVDs of the neighboring macroblocks, and $\alpha$ represents a constant for adjusting the motion search range.

BRIEF DESCRIPTION OF THE DRAWINGS

FIG. 4 illustrates an adaptive motion search range determining method according to an embodiment of the present invention.

DESCRIPTION OF SPECIFIC EMBODIMENTS

Hereinafter, an adaptive motion search range determining apparatus and method in accordance with the present invention will be described in detail with reference to the accompanying drawings. Herein, the drawings may be exaggerated in thicknesses of lines or sizes of components for the sake of convenience and clarity in description. Furthermore, terms used herein are defined in consideration of functions in the present invention and may be varied according to the custom or intention of users or operators. Thus, definition of such terms should be determined according to overall disclosures set forth herein.

Figure 1:
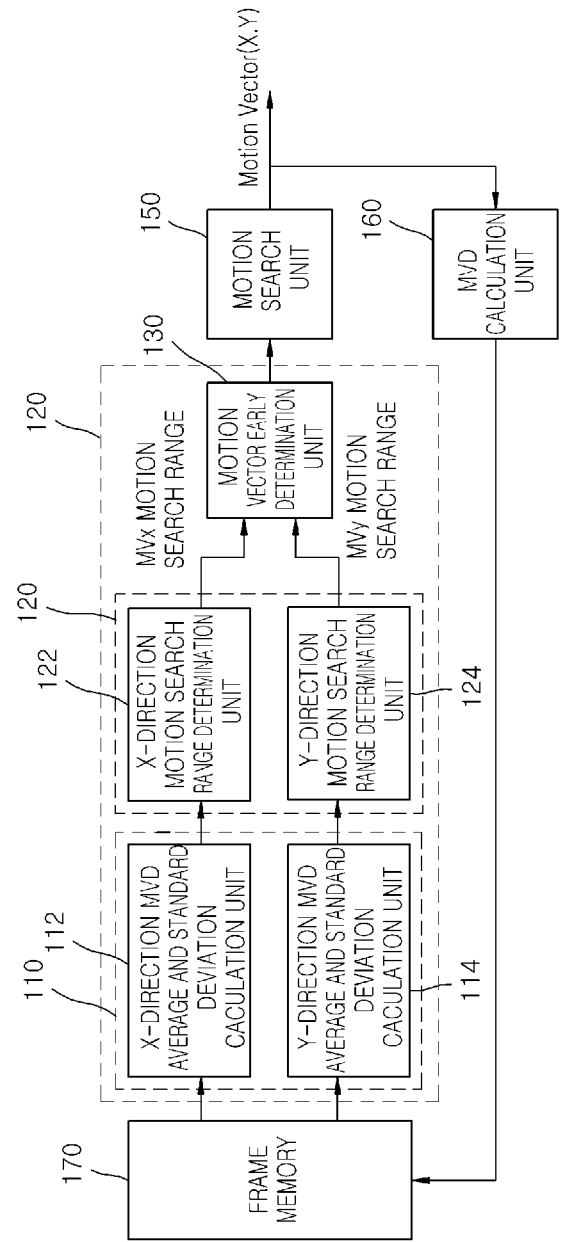
FIG. 1 illustrates a block diagram of a motion vector estimating apparatus according to an embodiment of the present invention.
Figure 2:
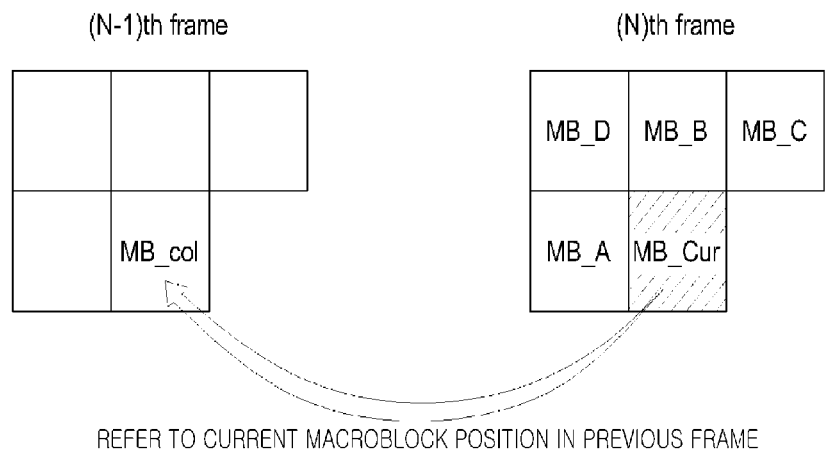
FIG. 2 illustrates neighboring macroblocks of a current macroblock according to an embodiment of the present invention.
Figure 3:
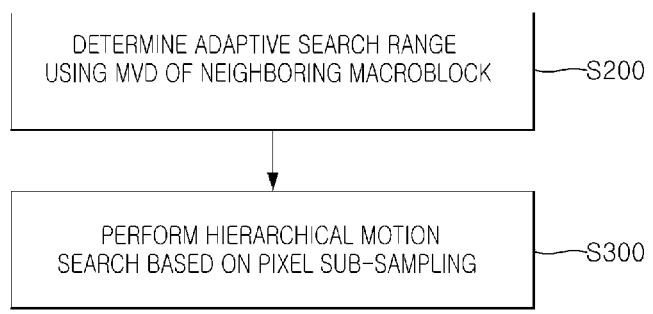
FIG. 3 illustrates a motion vector estimating method according to an embodiment of the present invention.

FIG. 1 illustrates a block diagram of a motion vector estimating apparatus according to an embodiment of the present invention, FIG. 2 illustrates neighboring macroblocks of a current macroblock according to an embodiment of the present invention, FIG. 3 illustrates a motion vector estimating method according to an embodiment of the present invention, and FIG. 4 illustrates an adaptive motion search range determining method according to an embodiment of the present invention.

A motion vector estimating apparatus 1 according to an embodiment of the present invention detects a motion vector of a current macroblock by performing a hierarchical motion search based on pixel sub-sampling within a motion search range determined adaptively for the current macroblock.

In this case, a motion search range determined for each macroblock is adjusted variably on the basis of motion vectors of neighboring macroblocks.

Especially, description will be given under the assumption that, for efficient compression in a video codec, a motion vector is not transmitted as it is but a Motion Vector Difference (MVD) calculated by subtracting a Motion Vector Predictor (MVP) from the motion vector is transmitted. Herein, for example, the MVP may be a median value of motion vectors of neighboring macroblocks.

When the MVP has high prediction performance, an MVD value (absolute value) of the current macroblock has a high correlation with neighboring macroblocks, and can be predicted from MVD samples of available neighboring macroblocks.

Experimental results showed that there was high probability that the MVD of the current macroblock would be zero when the average of MVD values of the neighboring macroblocks was zero, and an MVD value of the current macroblock was greater as the average of the MVD values of the neighboring macroblocks became greater.

Therefore, it can be known that the MVD of the current macroblock has a high correlation with the MVD values of the neighboring macroblocks, and the MVD value of the current macroblock can be predicted precisely from the MVD values of the neighboring macroblocks. That is, in the case of performing motion search while limiting a range to the range predicted around the MVP, a motion vector of the current macroblock can be estimated precisely.

As described above, the motion vector estimating apparatus 1 calculates the average of the MVD values of the neighboring macro blocks of the current macroblock, designates the area including neighboring macro blocks, and then performs motion estimation within the designated search area by a full search algorithm. Therefore, it is possible to reduce a search area, significantly reduce the computation quantity of motion estimation and required memory bandwidth, and further realize a very regular structure in terms of hardware implementation by performing full search.

As illustrated in FIG. 1, the motion vector estimating apparatus 1 includes an adaptive motion search range determination unit 100, a motion search unit 150, an MVD calculation unit 160, and a frame memory 170.

The frame memory 170 stores MVDs of neighboring macroblocks and MVD information of a previous image frame of the current macroblock for which a motion vector is estimated. Herein, MVD means a motion vector difference, which is obtained by subtracting a Motion Vector Predictor (MVP) from a real Motion Vector (MV). The MVD is the result value which calculated from the MVD calculation unit 160 to be described hereafter.

In the frame memory 170, MVD information of each macroblock is updated continually. It is desirable that before estimating a motion vector for the current macroblock, the frame memory 170 should store in advance the MVD information about macroblocks (including neighboring macroblocks) for which motion vectors are detected before the current macroblock within a current image frame, and the MVD information about macroblocks belonging to previous image frames.

In operation S200, the adaptive motion search range determination unit 100 adaptively determines a motion vector search range for the current macroblock using MVDs stored in the frame memory 170. Herein, the stored MVDs include MVDs of neighboring macroblocks of the current macroblock and MVD of a macroblock located at the position of the current macroblock in a previous image frame of the image frame to which the current macroblock belongs.

First, in operation S210, for the current macroblock, the adaptive motion search range determination unit 100 determines whether or not the number of motion vector information of neighboring macroblocks in the current image frame is greater than or equal to 4.

In the present embodiment, it is desirable that neighboring macroblocks of the current macroblock should be the macroblocks of which motion vectors have already been detected.

For example, as illustrated in FIG. 2, the neighboring macroblocks may be a total of 5 macroblocks, which may include three top macroblock (upper middle macroblock MB_B, upper right macroblock MB_C, and upper left macroblock MB_D) and one left macroblock MB_A of the current macroblock MB_Cur in the current image frame ((N)th frame), and the macroblock MB_col located at the same position as the position of the current macroblock MB_Cur in the previous image frame ((N−1)th frame). That is, the neighboring macroblocks of the current macroblock include the macroblocks MB_A to MB_D neighboring spatially in the same image frame, and the macroblock MB_col neighboring spatially in the continuous image frame.

Particularly, in the present embodiment, motion vectors of the four macroblocks MB_A to MB_D selected as neighboring macroblocks in the same image frame may be detected in advance according to sequential processing direction (left to right, top to bottom) of each macroblock for motion vector estimation.

Therefore, in operation S215, if the number of motion vector information of the neighboring macroblock of the current macroblock is smaller than 4, for example, if the position of the current macroblock corresponds to the macroblocks which are located at such special position as the edge of the present image frame, the search range is not determined by performing a search range determining method to be described hereafter but has an initially determined search range. That is, the minimum motion search range MV_min of the current macroblock has the minimum value (−search_range) of the initially determined search range, and the maximum motion search range MV_max has the maximum value (+search_range) of the initially determined search range.

If the number of motion vector information of neighboring macroblocks for the current macroblock is greater than or equal to 4, the adaptive motion search range determination unit 100 includes an MVD average/standard deviation calculation unit 110, a motion search range determination unit 120, and a motion vector early determination unit 130.

In operation S220, the MVD average/standard deviation calculation unit 110 calculates an average (avg) and a standard deviation (std) using MVDs which are read from the frame memory 170. Herein, the read MVDs include the MVDs of neighboring macroblocks of the current macroblock and the MVD of the macroblock at the same position as the position of the current macroblock in a previous image frame. The average is an average value of MVD values ABS (MVDs).

The MVD average/standard deviation calculation unit 110 may be divided into an X-direction MVD average/standard deviation calculation unit 112 and a Y-direction MVD average/standard deviation calculation unit 114 which are operated independently in each of X and Y directions, and accordingly may calculate an average and a standard deviation of each of X and Y components.

In operation S230, The motion search range determination unit 120 determines a motion search range of the current macroblock using the average and the standard deviation calculated from the MVD average/standard deviation calculation unit 110. The motion search range determination unit 120 may be divided into an X-direction motion search range determination unit 122 and a Y-direction motion search range determination unit 124 which are operated independently in each of X and Y directions, and accordingly may determinate independently a motion search range of each of X and Y components.

For this, first, the MVD value of the current macroblock is limited as in following Eq. (1).

$$|MVDx| \leq avgx + \alpha^* stdx, |MVDy| \leq avgy + \alpha^* stdy \qquad \text{Eq. (1)}$$

where, MVDx denotes an X component of an MVD of the current macroblock, avgx represents an average of X component values of MVDs of neighboring macroblocks, stdx denotes a standard deviation of X component values of MVDs of neighboring macroblocks, MVDy represent a Y component of an MVD of the current macroblock, avgy denotes an average of Y component values of MVDs of neighboring macroblocks, stdy represents a standard deviation of Y component values of MVDs of neighboring macroblocks, and α denotes a constant for adjusting motion search range.

A motion search range of the current macroblock is determined according to the MVD values obtained by Eq. (1), which is expressed in Eq. (2).

$$MVPx - (avgx + \alpha^* stdx) \leq MVx \leq MVPx + (avgx + \alpha^* stdx)$$

$$MVPy - (avgy + \alpha^* stdy) \leq MVy \leq MVPy + (avgy + \alpha^* stdy) \qquad \text{Eq. (2)}$$

where, MVPx and MVPy denote X and Y components of a Motion Vector Predictor (MVP), and MVx and MVy represent X and Y components of a Motion Vector of the current macroblock.

That is, in a motion search range, the minimum value MV_min is mvp−(avg+α*std), and the maximum value MV_max is mvp+(avg+α*std) regardless of X and Y components.

If one or more of the motion search range of X and Y direction set by Eq. (2) is "0 (zero)", the motion vector early determination unit 130 is enabled to operate, and may determine early one or more of X and Y components of motion vectors before the motion search unit 150 to be described later operates. It is possible to avoid an unnecessary motion search and to accordingly reduce the entire computation quantity by using the motion vector early determination unit 130.

In operation S240, if the motion search range set by Eq. (2) is all "0 (zero)" in X and Y directions, that is, if the maximum and minimum values of the motion search range are all "0 (zero)" (MV_max=0 and MV_min=0), the motion vector early determination unit 130 does not perform motion search and may determine early that motion vectors are (0, 0).

Meanwhile, if a search range in either of X or Y direction is "0 (zero)", the motion vector early determination unit 130 may perform motion search in either of Y or X direction based on the vector (0, 0).

In operation S250, in order to prevent the motion search range determined by Eq. (2) from exceeding an initially determined search range, motion search range may be limited to the initially determined search range. For example, in operation S260, if the difference between the maximum value and the minimum value of a motion search range is greater than a preset value (MV_max−MV_min>preset value), the maximum value and the minimum value of the motion search range are updated newly to the preset value. If not, the motion search range determined in operation S230 is sustained.

Also, in order to guarantee a search range minimally, the minimum search range may be designated.

In operation S300, the motion search unit 150 predicts a motion vector of the current macroblock by performing a full search according to the motion search range determined by the adaptive motion search range determination unit 100. For example, in order to reduce computation quantity based on the vector (0, 0) of the current macroblock, a motion vector which is multiplied by an integer may be predicted by performing 1-pixel or 2-pixel units full search of a 2:1 subsampling technique.

Thereafter, the motion search unit 150 may predict a final motion vector by hierarchically performing a detailed motion search again based on a previous predicted motion vector.

However, the motion search unit 150 does not perform motion searches for one or more components (at least one of X and Y components) of the motion vector that has been early determined by the motion vector early determination unit 130. For example, when a motion vector is early determined as (0, 0), the motion search unit 150 may predict the motion vector determined early by the motion vector early determination unit 130 as a final motion vector. Alternatively, when a search range in one of X and Y directions is "0 (zero)", one of the X or Y components of a motion vector is determined early as "0 (zero)", and the motion search unit 150 may predict a final motion vector by performing a unidirectional full search in the other direction, i.e. in either Y or X direction.

The MVD calculation unit 160 calculates the MVD of the current macroblock which is the difference value between the final motion vector of the current macroblock predicted by the motion search unit 150 and the Motion Vector Predictor (MVP), and then stores the MVD in the frame memory 170. Herein, Motion Vector Predictor (MVP) may be a median of motion vectors of neighboring macroblocks.

The MVD of the current macroblock stored in the frame memory 170 is used to determine motion search ranges of other neighboring macroblocks within the current image frame or the macroblock located at the same position in a next image frame.

In the present embodiment, it can be confirmed from experimental results that in UHD high-resolution images, the improvement of image quality and the variation of bit rate are saturated at level of ±32, ±64 of the size of search range. These results mean that even though the size of images are as large as UHD class, there is no need to increase the size of search range up to a specific value or more in terms of encoding gain at least. Therefore, it is necessary to pursue a high-speed motion search by using adaptive search ranges suitably according to characteristics of images rather than allowing the computation quantity of motion search to be complicated by setting the size of search ranges to a fixed value regardless of input images.

Especially, in the present embodiment, an adaptive search range is set based on MVD values, and therefore it is possible to reduce a computation quantity needed during a motion search by limiting the motion search carried out within unnecessary search range. Furthermore, in the case of hardware implementation, since the present embodiment is based on the full search technique capable of parallelization, regular structure and Processing Unit (PE) are increased, thereby realizing high-speed performance.

Hitherto, in the present embodiment, performance evaluation was performed under the condition that the basis of motion search is limited to not Motion Vector Predictor (MVP) but (0, 0). However, the present invention should not be limited to that condition, but may apply to even the case of performing motion search based on the Motion Vector Predictor (MVP) according to the embodiment of the present invention.

As described above, according to the present invention, it is possible to enable each macroblock to have an adaptive search range by variably adjusting a search range of a motion vector with reference to neighboring motion vectors using the fact that a motion vector of a current macroblock is similar to motion vectors of neighboring macroblocks at the nearest positions.

Moreover, according to the present invention, it is also possible to minimize image degradation during the motion searches of high-resolution images by variably adjusting search ranges for motion vectors, and also to encode high-resolution images such as UHD images by limiting motion searches in unnecessary areas and thus minimizing the computation quantities required for prediction of motion vectors.

While the present invention has been described with respect to the specific embodiments, it will be apparent to those skilled in the art that various changes and modifications may be made without departing from the spirit and scope of the invention as defined in the following claims.

What is claimed is:

1. An adaptive motion search range determining apparatus, comprising:
   an MVD (Motion Vector Difference) average/standard deviation calculation unit configured to calculate a value average and a standard deviation of MVDs of neighboring macroblocks of a current macroblock, wherein the MVDs are difference values between motion vectors of the neighboring macroblocks and a Motion Vector Predictor (MVP) and are stored sequentially in a frame memory, the Motion Vector Predictor (MVP) being a median of the motion vectors of the neighboring macroblocks; and
   a motion search range determination unit configured to determine a motion search range of the current macroblock using the value average and the standard deviation, wherein the neighboring macroblocks comprise a left macroblock, an upper middle macroblock, an upper left macroblock, and an upper right macroblock of a current image frame to which the current macroblock belongs, and a macroblock located at the same position as a position of the current macroblock in a previous image frame.

2. The adaptive motion search range determining apparatus of claim 1, wherein the motion search range determination unit determines the motion search range of the current macroblock as an initially determined search range when the number of motion vector information of the neighboring macroblocks is smaller than 4.

3. The adaptive motion search range determining apparatus of claim 1, wherein the motion search range determination unit updates the motion search range of the current macroblock as an initially determined search range when the motion search range is greater or smaller than the initially determined search range.

4. The adaptive motion search range determining apparatus of claim 1, further comprising a motion vector early determination unit configured to make an early determination of at least one of X and Y components of a motion vector of the current macroblock as 0 (zero) when at least one of the X and Y components of the motion search range is 0 (zero).

5. The adaptive motion search range determining apparatus of claim 1, wherein the motion search range determination unit determines the motion search range according to Equations below:

$$MVPx-(avgx+\alpha*stdx) \leq MVx \leq MVPx+(avgx+\alpha*stdx)$$

$$MVPy-(avgy+\alpha*stdy) \leq MVy \leq MVPy+(avgy+\alpha*stdy)$$

where, MVPx and MVPy denote an X component and a Y component of the Motion Vector Predictor (MVP), respectively, MVx and MVy represent an X component and a Y component of a motion vector of the current macroblock, respectively, avgx denotes an average of X component values of the MVDs of the neighboring macroblocks, stdx represents a standard deviation of the X component values of the MVDs of the neighboring macroblocks, avgy represents an average of Y component values of the MVDs of the neighboring macroblocks, stdy denotes a standard deviation of the Y component values of the MVDs of the neighboring macroblocks, and α represents a constant for adjusting the motion search range.

6. An adaptive motion search range determining method, comprising:

using an MVD (Motion Vector Difference) average/standard deviation calculation unit to calculate a value average and a standard deviation of MVDs of neighboring macroblocks of a current macroblock that are read from a frame memory, wherein the MVDs are difference values between motion vectors of the neighboring macroblocks and a Motion Vector Predictor (MVP), and the Motion Vector Predictor (MVP) is a median of the motion vectors of the neighboring macroblocks; and using a motion search range determination unit to determine a motion search range of the current macroblock using the value average and the standard deviation, wherein the neighboring macroblocks comprise a left macroblock, an upper middle macroblock, an upper left macroblock, and an upper right macroblock of a current image frame to which the current macroblock belongs, and a macroblock located at the same position as a position of the current macroblock in a previous image frame.

7. The adaptive motion search range determining method of claim 6, wherein the calculating of the value average and standard deviation and the determining of the motion search range are performed when the number of motion vector information for the neighboring macroblocks of the current macroblock is 4 or more in a current image frame stored in the frame memory, and the motion search range of the current macroblock is precedently determined as an initially determined search range when the number of motion vector information of the neighboring macroblocks is smaller than 4.

8. The adaptive motion search range determining method of claim 6, wherein the determining of the motion search range comprises updating the motion search range of the current macroblock as the initially determined search range when the motion search range is greater or smaller than the initially determined search range.

9. The adaptive motion search range determining method of claim 6, further comprising determining early at least one of X and Y components of a motion vector of the current macroblock as 0 (zero) when at least one of X and Y components of the motion search range is 0 (zero).

10. The adaptive motion search range determining method of claim 6, wherein the determining comprises determining the motion search range according to Equations below:

$$MVPx-(avgx+\alpha*stdx) \leq MVx \leq MVPx+(avgx+\alpha*stdx)$$

$$MVPy-(avgy+\alpha*stdy) \leq MVy \leq MVPy+(avgy+\alpha*stdy)$$

where, MVPx and MVPy denote an X component and a Y component of the Motion Vector Predictor (MVP), respectively, MVx and MVy represent an X component and a Y component of a motion vector of the current macroblock, respectively, avgx denotes an average of X component values of the MVDs of the neighboring macroblocks, stdx represents a standard deviation of the X component values of the MVDs of the neighboring macroblocks, avgy represents an average of Y component values of the MVDs of the neighboring macroblocks, stdy denotes a standard deviation of the Y component values of the MVDs of the neighboring macroblocks, and α represents a constant for adjusting the motion search range.

* * * * *